ELECTRO-OPTICAL COMPUTING SYSTEM

Filed Dec. 30, 1963 4 Sheets-Sheet 1

INVENTOR.
SERGEI M. FOMENKO
BY
Allen M. Sutton
ATTORNEY

INVENTOR.
SERGEI M. FOMENKO
BY
Allen M. Sutton
ATTORNEY

INVENTOR.
SERGEI M. FOMENKO
BY Allen M. Sutton
ATTORNEY

Aug. 30, 1966 S. M. FOMENKO 3,270,187

ELECTRO-OPTICAL COMPUTING SYSTEM

Filed Dec. 30, 1963 4 Sheets-Sheet 4

INVENTOR.
SERGEI M. FOMENKO
BY
Allen M. Sutton
ATTORNEY 3,270,187
ELECTRO-OPTICAL COMPUTING SYSTEM Sergei M. Fomenko, Los Angeles, Calif., assignor to The Bunker-Ramo Corporation, Stamford, Conn., a corporation of Delaware Filed Dec. 30, 1963, Ser. No. 334,368
19 Claims. (Cl. 235—152)

The present invention relates to an electro-optical computing system and more particularly to an optimum organization of electro-optical devices in a system useful for performing computational functions.

The use of various electro-optical devices as transducing elements in systems for civilian as well as military purposes is well known. Most of these devices exhibit some phenomenon which relates electrical characteristics to light. For example, an electroluminescent element has the characteristic of emitting light under the influence of an electric field or an electrical potential which is applied across it. Such an element may be regarded as a light emitter, and hereafter will be referred to as an "E" element. A photoconductor element, on the other hand, has a characteristic of having its electrical resistance greatly reduced under the influence of light directed thereon or admitted thereto, and will hereafter be referred to as an "A" element.

Although such electro-optical elements are quite reliable, their response time, which may be defined as the time between the application of input signals thereto and the time output signals are produced, is relatively long and, therefore, their use in high speed computing systems is limited. Their use may be more extensive in systems performing various logical type operations which do not have to be performed at a very high speed such as in desk calculators. However, even in such relatively low speed devices, they have not been utilized to the fullest advantage since the wiring of the elements within such systems has been too complex. In some prior art devices, for example, electro-optical elements are interconnected by means of fiber-optic materials through which light is made to pass through complex curved paths, which reduce the over-all reliability and increase the price of such devices.

Most of the foregoing disadvantages are eliminated and others greatly reduced by the present invention, which teaches a novel arrangement of incorporating and integrating electro-optical elements in logic circuitry and computing systems.

The present invention is based on electroluminescence and photoconductive phenomena, and the intercoupling of elements exhibiting such phenomena in circuitry which is arranged in substantially matrix configurations. All logical operations, including the transfer of information, are accomplished by means of optical signals which pass along very short optical paths. This is possible because of the particular physical organization of the components, including the electro-optical elements within the computing system or other circuitry. According to the teachings disclosed herein, the components are arranged in a simple over-all structure which is small in size and weight and which is adaptable to inexpensive manufacture and mass production. Further, according to the teaching of the present invention, substantially all wiring between components is eliminated, with electrical power being supplied to all electro-optical elements by means of a simple crossbar grid of electrical conduits or conductors.

Basically, the present invention is based on gating circuitry which employs at least one E (electroluminescent) and one A (photoconductive) element connected between a pair of conductors which are at different electrical potential levels. As long as the A element does not admit light, i.e., the element is cut off, it provides a relatively high electrical resistance between the two conductors so that the electrical potential difference between the pair of conductors is maintained across the E element which, due to its electroluminescent property, emits light. Hereafter, an E element which emits light will be regarded as being "ON." However, as soon as light is directed at the A element, its electrical resistance drops substantially so that the electrical potential across the E element drops below the value necessary to energize the E element. This results in the deenergization of the E element, i.e., it is cut off so that it no longer emits any light, until the A element associated therewith is again cut off so that a sufficient electrical potential difference between the pair of conductors is present to cause the E element to again emit light. Such gating circuits, which will hereafter be described in greater detail, are intercoupled to provide bistable circuitry, such as conventional flip-flops.

In another embodiment of the invention a plurality of electro-optical flip-flops and gating circuitry are arranged in novel matrix organizations so as to perform computing functions such as are utilized in various computing systems which are based on bistable or binary principles.

The novel features which are believed to be characteristic of the invention both as to the logic circuitry and computing systems employing electro-optical elements, together with other features and advantages thereof, will be better understood from the following description taken in conjunction with the accompanying drawings, in which.

Figures 5, 9:
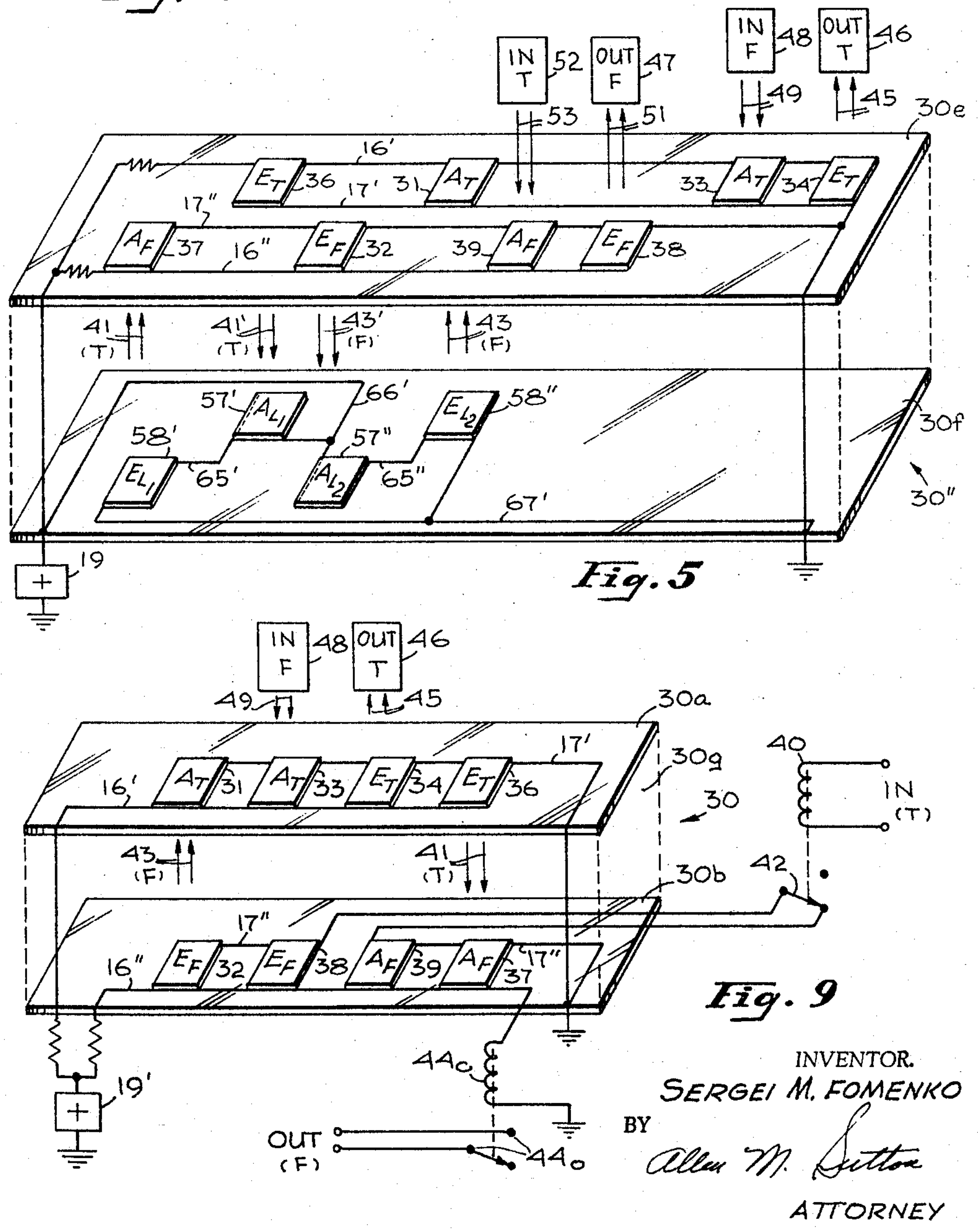
FIG. 5 is a combination isometric and schematic diagram of another embodiment of the present invention.
Figures 7A, 8:
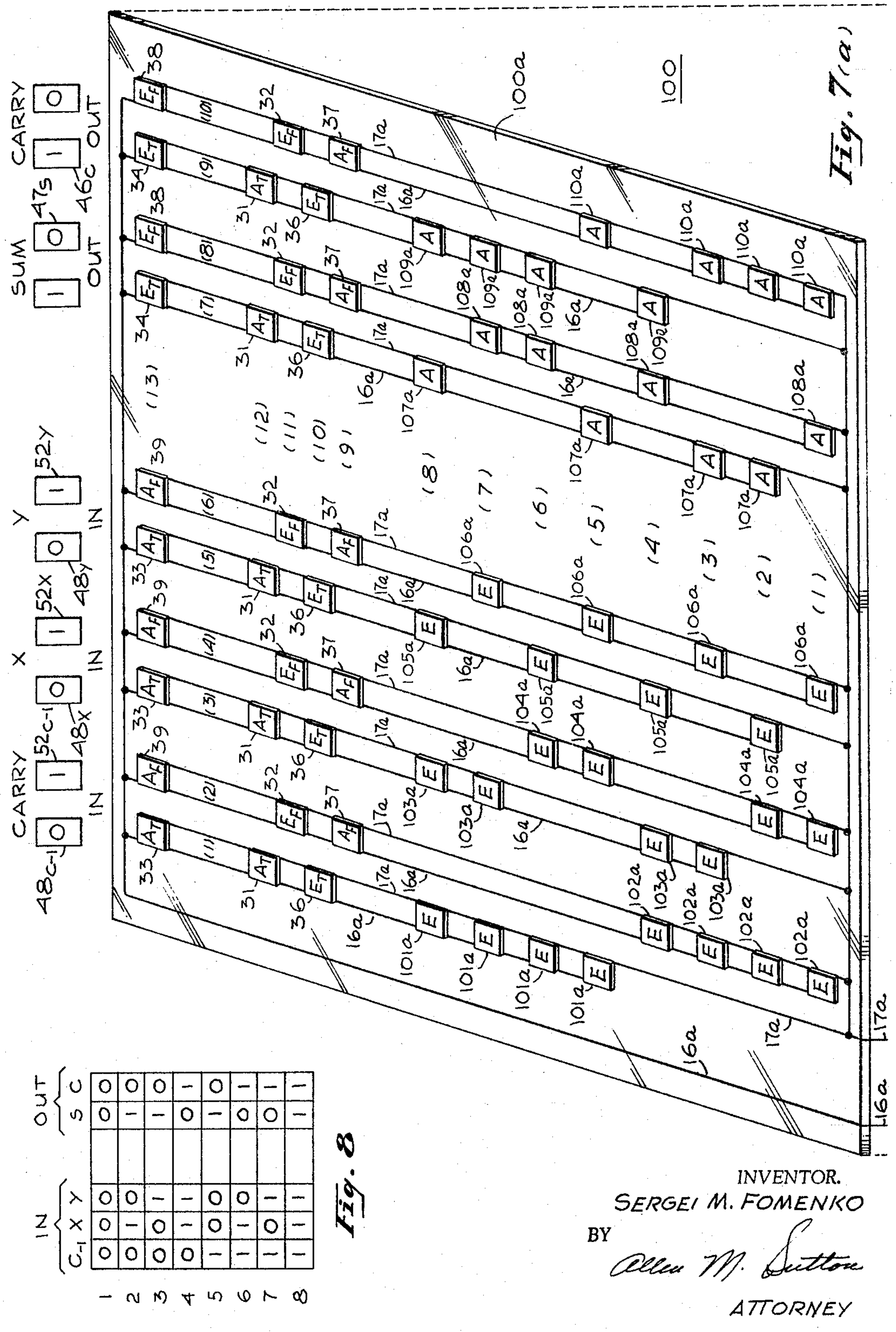
Figure 7B:
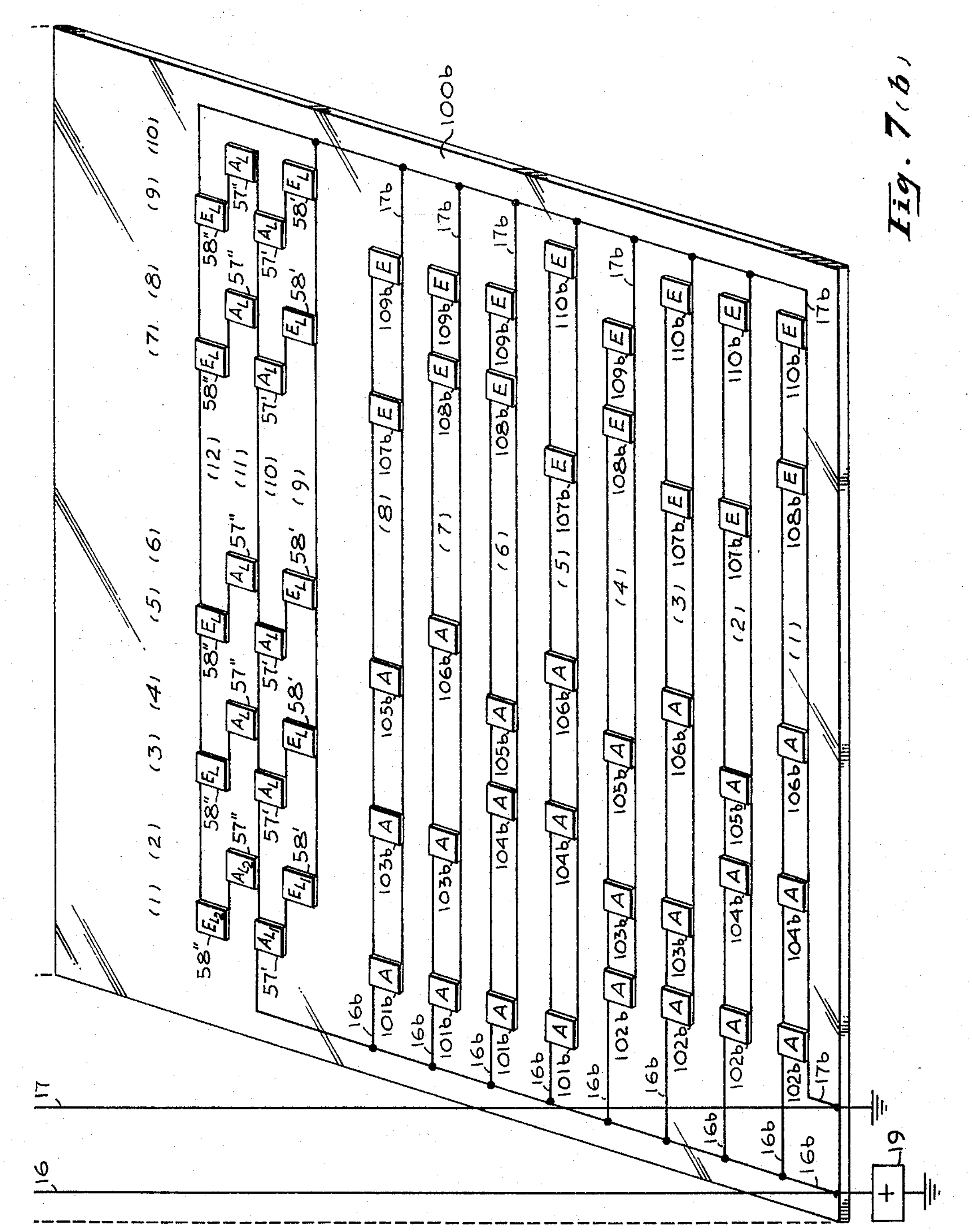

FIGS. 7(*a*) and 7(*b*) are a combination isometric and schematic diagram of still another embodiment of the present invention;

FIG. 8 is a chart useful in explaining the operation of the embodiment shown in FIGS. 7(*a*) and 7(*b*); and FIG. 9 is a combination isometric and schematic diagram of another embodiment of the invention.

Figure 1:
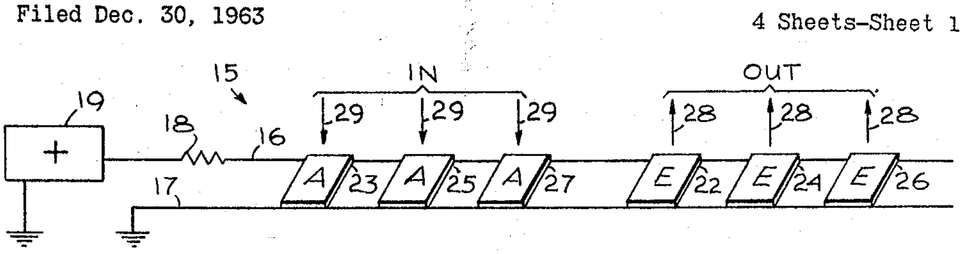
FIGURE 1 is a schematic diagram useful in explaining the principles underlying the present invention.

Reference is now made to FIG. 1 wherein a gating circuit 15 is shown as comprising a conductor 16 connected through a resistor 18 to one side of a source of potential or power such as a positive voltage source 19, the other side of which is coupled to ground. The circuit 15 also comprises a conductor 17 which is coupled to ground, so that a voltage difference substantially equal to the voltage produced by the source 19 may exist between the conductors 16 and 17. As seen in FIG. 1, three E (electroluminescent) elements 22, 24 and 26, as well as three A (photoconductive) elements 23, 25 and 27, are connected between the conductors 16 and 17. From the foregoing explanation, it is apparent that as long as none of the A elements admits light from any input source, the A elements will be cut off, i.e., will exhibit relatively high electrical resistsance between the conductors 16 and 17 so that a relatively high electrical potential difference will be present between them. This potential difference in turn will cause the E elements to be "ON," i.e., emit light as indicated by arrows 28. However, as soon as any of the A elements 23, 25 or 27 is illuminated by light directed thereto, as indicated by arrows 29, that particular A element will turn "ON," i.e., will exhibit a low electrical resistance thereacross, so that most of the potential produced by the source 19 will drop across the resistor 18 with a minimum of potential difference being present between the conductors 16 and 17. As a result, insufficient potential difference will be present across the E elements 22, 24 and 26 to energize them, which will therefore become cut off, i.e., not emitting any output light. It is apparent therefore that the gating circuitry 15 acts as a conventional NOR gate which may be defined as a circuit which has its output signal or signals, such as the light indicated by the arrows 28, inhibited if any input signal, such as light indicated by the arrows 29, illuminates any of a plurality of input lines, such as the A elements 23, 25 and 27.

Although in FIG. 1 three A elements and three E elements are shown, it is clear that the gating circuitry shown therein may comprise any number of A or E elements, the only requirement being that it include at least one element of each type, all such arrangements being within the contemplation of the invention.

As is well known, suitable materials for the photoconductive elements (A) are some selenides or tellurides of zinc, cadmium or lead; suitable materials for the electroluminescent elements (E) are phosphors such as zinc sulphate or silicon carbide.

Figure 2:
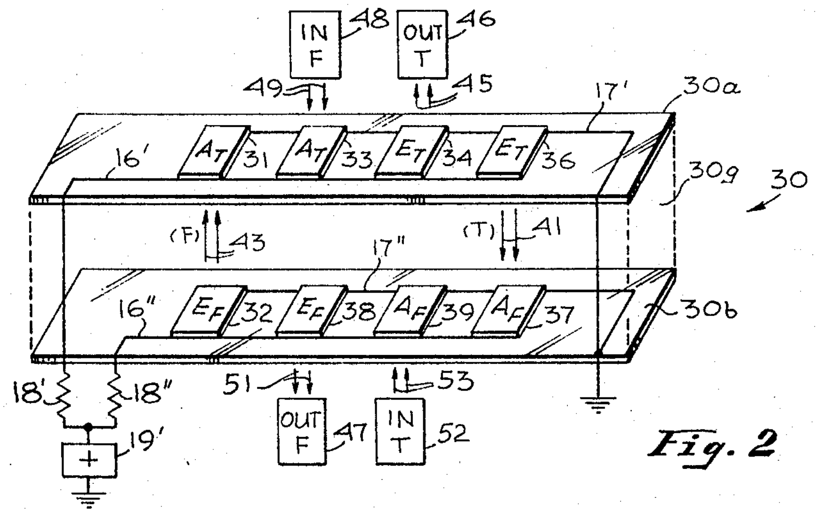
FIG. 2 is a combination isometric and schematic diagram of one embodiment of the present invention.

The principles underlying the operation of the gating circuitry 15 of FIG. 1, which hereafter will be referred to as a NOR gate, are incorporated, as seen in FIG. 2, in an arrangement of electro-optical elements which acts in a manner similar to a bistable circuit such as a flip-flop. As seen therein, a bistable circuit 30 comprises A elements 31 and 33 and E elements 34 and 36 connected in parallel between conductors 16′ and 17′, the conductor 17′ being connected to ground and the conductor 16′ connected through a resistor 18′ to one side of a source of positive potential 19′, the other side of which is also grounded. From the foregoing description, it is clear that the elements 31, 33, 34, 36 in connection with the source 19′, the resistor 18′, and the conductors 16′ and 17′ comprise a NOR gate similar to the gating circuitry 15 of FIG. 1. It should be noted that the elements 31, 33, 34 and 36 are all arranged on a first level or layer **30*a*. The source 19′ is also connected to a conductor 16″ through a resistor 18″, while another conductor 17″ is connected to ground. A elements 37 and 39 and E elements 32 and 38 are connected in parallel between the conductors 16″ and 17″, which together with the resistor 18″ and the source 19′ comprise another NOR gate. The elements 32, 37, 38 and 39 are arranged on a second level or layer 30*b*, with the space between the layers 30*a* and 30*b* either being unoccupied or being occupied by a transparent light transmitting material 30*g***.

The A element 37 is positioned substantially under the E element 36 so that when the E element is "ON," i.e., emits light as indicated by arrows 41, the A element 37 is also "ON," i.e., exhibits low electrical resistance between the conductors 16″ and 17″ which inhibits or cuts off any light from being emitted by the E elements 32 and 38. Similarly, the E element 32 is positioned below the A element 31 so that when the E element 32 is "ON," i.e., emitting light toward the A element 31, as indicated by arrows 43, the A element 31 is "ON," causing the E elements 34 and 36 which are across the conductors 16′ and 17′ to become inhibited from transmitting any light therefrom.

The following example is presented to further clarify the operation of the novel bistable circuit 30 of FIG. 2. Let us assume that the NOR gate of the level **30*a*, which includes the A elements 31 and 33 and the E elements 34 and 36, is uninhibited, i.e., that E elements 34 and 36 emit light, this state being regarded as a true state indicated by the subscript T of the elements 31, 33, 34 and 36. In this state, the E element 34 emits light as indicated by arrows 45 which is detected by an output stage 46, thus producing an output signal which indicates that the circuit 30 is in the true state. During this state, the E element 36 is also "ON," emitting light, which, as previously explained, causes the A element 37 to be "ON," inhibiting the NOR gate on the level 30*b* and preventing the E elements 32 and 38 associated therewith from being "ON." Since the E element 32 is cut off, it does not energize or illuminate the A element 31 positioned above it. Similarly, the E element 38, which is cut off, is not emitting light towards an output stage 47. The circuit 30 will remain in the true state until a false input signal, such as light from a false input stage 48, illuminates the A element 33 as indicated by arrows 49. Such a false input signal will cause the A element 33 to be "ON," inhibiting the E elements 34 and 36, thereby causing the light emitted by them to the true output stage 46 and the A element 37, respectively, to be cut off. This results in the absence of a true output signal from the stage 46 and further the cutting off of the A element 37 results in a large potential difference existing between the conductors 16″ and 17″. This causes the E elements 32 and 38 to be "ON." As seen from FIG. 2, the E element 38, when "ON," emits light, as indicated by arrows 51, towards the false output stage 47, which produces a signal indicating that the bistable circuit 30 is in the false stable state. At the same time the E element 32 is "ON," illuminating the A element 31, which inhibits the NOR gate on the level 30*a* or the true portion of the bistable circuit 30. The circuit 30 will remain in the false state until a true input signal in the form of light from a true input stage 52 illuminates the A element 39, as indicated by arrows 53. The light from the input stage 52 will cause the A element 39 to be "ON," inhibiting the E elements 38 and 32, which results in the cessation of a false output signal from the stage 47 as well as cutting off the E element 32 from further illuminating the A element 31. This results in the reenergization of E elements 34 and 36, which causes the bistable circuit 30 to return to the true stable state, as indicated by an output signal from stage 46, due to the light which is emitted thereto by the E element 34**.

From the foregoing, it is seen that the bistable circuit 30 of FIG. 2 may be "ON" in either of two stable states, in a manner similar to a conventional flip-flop which is so extensively employed in various logic circuits. Further, it should be pointed out that the circuit 30 as shown in FIG. 2 comprises two separate layers **30*a* and 30*b* on which the respective electro-optical elements are arranged and which are energized during the true and false states of the bistable circuit. The space between the layers may be occupied or filled with a transparent material which in a practical application may be only one millimeter (mm.) thick. It should further be clear from FIG. 2 and the foregoing description that all logical operations, including the transfer of information, are accomplished by means of optical signals, namely, the transmission of light. The only wiring necessary extends from the layers 30*a* and 30*b* to the resistors 18′ and 18″, respectively, which may be mounted on the respective layers 30*a* and 30*b*, or they may be connected near the potential source 19′. The conductors 16′ and 17′ on the layer 30*a* and the conductors 16″ and 17″ on the layer 30*b* may be plated or otherwise deposited thereon before the E and A elements are assembled therebetween, so that the entire bistable circuit may be conveniently assembled by combining the preassembled layers 30*a*, 30*b*, and 30*g***.

Figure 3:
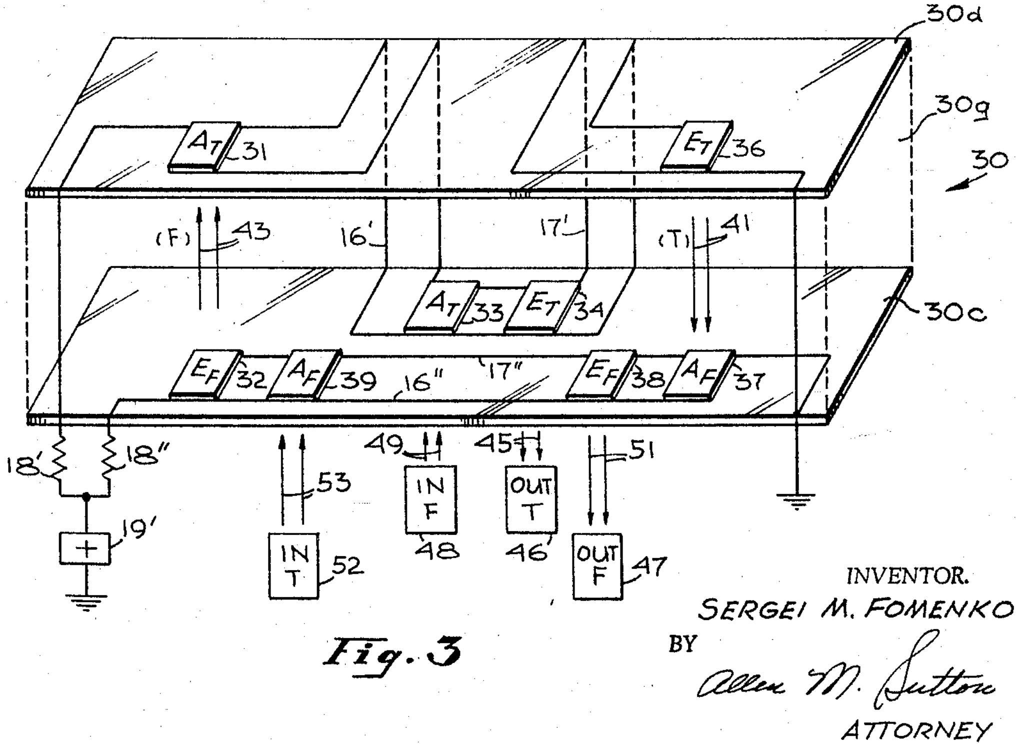
FIG. 3 is a combination isometric and schematic diagram of another embodiment of the present invention.

Although the bistable circuit 30 of FIG. 2, which incorporates the electro-optical elements in a novel arrangement as described above, performs most satisfactorily, yet in some cases it is desirable to have all the input and output stages, such as the stages 46, 47, 48, and 52, on the same side with respect to the circuit 30. Therefore, in another embodiment of the present invention, most of the electro-optical elements are so located with respect to a single layer **30*c* of a bistable circuit 30′, shown in FIG. 3, as to permit such an arrangement of the input and output stages. All the elements shown in FIG. 3 bear reference numerals similar to those used in FIG. 2 and perform in a manner similar to that heretofore described. Therefore, the description will not be repeated. However, as previously explained in connection with FIG. 2, the A element 31 and the E element 36 of the NOR gate on the layer 30***a*, or the true portion of the circuit, have to be positioned above the E element 32 and the A element 37 of the false portion of the bistable circuit, respectively. Therefore, as seen in FIG. 3, in that embodiment of the invention, the circuit 30′ comprises a second layer 30*d* on which are mounted the A element 31 and the E element 36, the two elements being respectively positioned above elements 32 and 37 on the layer 30*c*. The elements 31 and 36 are connected across the conductors 16′ and 17′ which pass from the layer 30*c* to the layer 30*d*. As seen from FIG. 3, the input and output stages 46, 47, 48 and 52 are all on the same side with respect to the circuit 30′. However, to attain such an advantage, the intercoupling of the circuit is made somewhat less advantageous, in that the conductors 16′ and 17′ have to pass from the layer 30*c* to the layer 30*d*, so that the electro-optical elements 31, 33, 34 and 36 are all connected between the same conductors, namely, the conductors 16′ and 17′.

In still another embodiment of the present invention, a bistable circuit employing electro-optical elements is arranged in a novel configuration with all the input and output stages associated therewith being on the same side thereof without the need to interconnect layers with conductors such as the conductors 16′ and 17′ of FIG. 3. Before describing the present embodiment in detail, reference is first made to FIG. 4 wherein an OR gate 55 is shown comprising an A element 57 connected to one side of a source of positive potential 19*a* through a conductor 66, and to another conductor 65. The other side of the source 19*a* is also connected to ground. An E element 58 is connected to the conductor 65 and to a grounded conductor 67. From the foregoing description of the photoconductive characteristics of A elements and the electroluminescent characteristics of E elements, it can be shown that the E element 58 will be cut off, i.e., not emitting any light, so long as the A element 57 is not being illuminated by an input light signal. This is a direct result of the fact that when the A element 57 is cut off, it exhibits a high electrical resistance so that in the circuit 55 most of the potential produced by the source 19*a* drops across the A element 57 so that the potential difference between the conductors 65 and 67, which is impressed across the E element 58, is insufficient to activate the element. However, as soon as the A element 57 is illuminated by an input light signal, such as indicated by an arrow 68, the A element 57 is "ON," namely, exhibiting a low electrical resistance between the conductors 66 and 65, so that most of the potential produced by the source 19*a* is impressed across E element 58, which may be sufficient to activate or energize the E element 58 so that it produces an output light signal as indicated by an arrow 69.

Reference is now made to FIG. 5 wherein a bistable circuit 30″ is shown. As seen therein, the circuit 30″ comprises a first layer 30*e* on which E elements 34 and 36 and A elements 31 and 33 are connected in parallel between conductors 16′ and 17′, which are in turn connected to a source of positive potential 19 and ground, respectively. Similarly, E elements 32 and 38 and A elements 37 and 39 are connected in parallel between conductors 16″ and 17″, which are in turn connected to the source of positive potential and ground, respectively. All the elements on the layer 30*e* perform in a manner identical to that previously described in connection with FIGS. 2 and 3, with the E elements 34 and 38 emitting output light signals when the circuit 30″ is in a true or false state, respectively. The A elements 33 and 39 serve as light admitters to set the circuit 30″ in the false or true state, respectively, and the electro-optical elements 31, 36, 32, and 37 serve to stabilize the circuit 30″ in either a true or a false stable state. However, whereas in the previously described embodiments of the bistable circuit of the invention the elements 31 and 36 are shown to be on one level above the elements 32 and 37, respectively, which are mounted on a second level, as seen in FIGS. 2 and 3, in the present embodiment all four elements are on a single level (30*e*), as seen in FIG. 5. In that embodiment, the optical intercoupling between the elements 36 and 37 and the elements 32 and 31 is accomplished by incorporatiing E elements 58′ and 58″ and A elements 57′ and 57″ which are mounted on a second layer 30*f*. The elements 57′ and 57″ are connected in parallel to the source of positive potential 19 by means of a conductor 66′. The element 57′ is also connected to the element 58′ through a conductor 65′, the other side of the element 58′ being grounded by means of a conductor 67′. Similarly, the element 57″ is connected to the element 58″ through a conductor 65″, the other side of the element 58″ being grounded by means of the conductor 67′.

Figure 4:
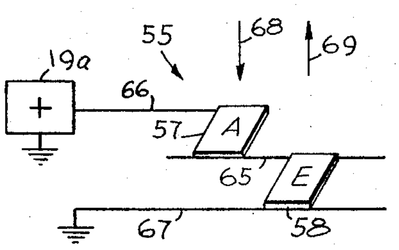
FIG. 4 is a schematic diagram useful in explaining the operation of some embodiments of the present invention.

From the previous description of the OR gate 55 of FIG. 4, it is seen that the elements 57′ and 58′ (FIG. 5) connected across the positive potential source 19 also operate as an OR gate similar to the gate 55 (FIG. 4). When the A element 57′ is "ON," namely, being illuminated by light from the E element 36 as indicated by arrows 41′, when the circuit 30″ is in the true state, the E element 58′ is "ON" so that it illuminates the A element 37 as indicated by the arrows 41. With the A element 37 being "ON," the E elements 32 and 38 are cut off so that the circuit 30″ remains in the true state, with the false portions of the circuit 30″ being inhibited or cut off. Similarly, the A element 57″ and the E element 58″ and the conductors associated therewith function as another OR gate similar to the OR gate 55 of FIG. 4. For example, when the E element 32 is "ON," i.e., the circuit 30″ is in the false stable state, the A element 57″ is turned "ON" by light from the E element 32, indicated by arrows 43′. With the A element 57″ being "ON," the E element 58″ is "ON," so that light therefrom, as indicated by the arrows 43, illuminates the A element 31 which inhibits the true portion of the bistable circuit 30″, so that the circuit remains in the false stable state.

In the foregoing description, three different embodiments of a bistable circuit incorporating the novel arrangement of electro-optical elements in accordance with the teachings of the invention have been disclosed. The bistable circuit comprises two layers on which electro-optical elements are arranged between pairs of conductors, with all logical operations including transfer of information being accomplished by means of optical or light signals passing through short paths between corresponding E and A elements. The pairs of conductors which supply the power or potential across the elements comprise simple crossbar grids. The layers may comprise etched circuits such as are used in printed circuits, well known in the art, with the pairs of conductors plated thereon, and provisions made for mounting the various electro-optical elements therein. Such techniques adapt the bistable circuit of the invention to mass production and reduced costs of manufacturing, since each circuit can be manufactured as two separate layers which are then coupled together with a transparent light transmitting medium therebetween. The end terminals of the plated conductors may then be connected to an external source of potential.

Figure 6:
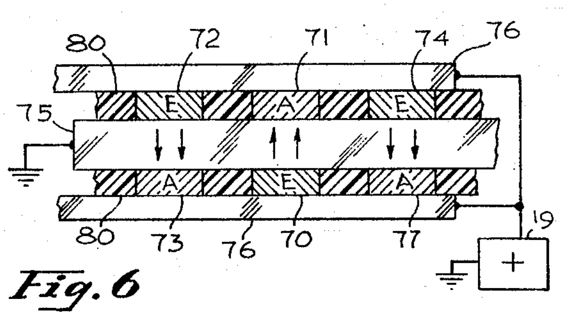
FIG. 6 is an elevational view of one arrangement of components according to the present invention.

Although in FIGS. 2, 3, and 5 the pairs of conductors supplying the potential to the elements are shown as being coupled to the sides of the elements, the invention is not to be regarded as limited thereto, since the electroluminescent elements incorporated in the present invention may be energized on the top and bottom thereof. For example, in another embodiment of the present invention, elements may be arranged as seen in FIG. 6, wherein the electro-optical elements, such as E elements

70, 72 and 74 and A elements 71, 73 and 77, are arranged in two layers above and below a light-transmitting, electrically conductive material 75, such as conductive glass, which is electrically grounded. As seen therein, the material 75 couples all the electro-optical elements to ground, with conductors 76 connecting them to one side of a source of positive potential 19, the other side of which is connected to ground. The space between the electro-optical elements is filled by insulators 80 which prevent the elements from shorting together.

From the foregoing description, it is apparent that substantially no wiring is necessary in assembling the bistable circuits of the invention, which may be constructed by organizing the electro-optical elements in the novel arrangements disclosed herein with all power supplied to the element through grid crossbar printed electrical conductors. The simplicity in constructing the circuits greatly reduces the cost of manufacturing, and with presently available small electro-optical elements the circuits can be produced to be of relatively small dimension and of a minimum weight, which adapts them for use in small, light weight computing systems such as small desk calculators and pocket size computing devices.

Since gating and bistable circuits, such as the NOR gate, OR gate and the bistable circuits described above, are among the fundamental circuits used in most computing systems, it is apparent that the foregoing description teaches one familar in the art to construct such systems by employing the novel arrangements disclosed herein. Therefore, it is to be understood that the following description of specific circuitry employed in binary computing systems is presented for explanatory purposes only, and that other computing circuits employing the teachings disclosed herein are within the contemplation of the present invention.

Reference is now made to FIGS. 7(*a*) and 7(*b*), which are a combination isometric and schematic diagram of a full binary adder 100 constructed in accordance with the teaching of the invention. Full binary adders are used extensively in computing systems and devices to perform binary mathematical computations, and they are widely described in the computer literature. For example, a description of a full binary adder is presented in "Arithmetic Operations in Digital Computers," written by R. K. Richards, published by D. Van Nostrand Company Inc., Library of Congress Catalog Card No. 55-6234, in Chapter 4, starting on page 83, with special emphasis on page 89. Briefly, a full binary adder may be defined as a circuit which is capable of accepting two binary signals representing the augend and addend binary digits of a corresponding order of two binary numbers, and a carry binary signal from a lower binary order, and poducing a sum binary signal and a carry binary signal for use by the next higher binary order. For example, in adding two 3-bit binary numbers, such as 101 and 011, the full adder for the second bit or order receives binary signals corresponding to the 0 and 1 of the second order of the two numbers. In addition, the full binary adder receives a carry binary signal from the lower binary order, which, in our example, produces a carry binary signal corresponding to a 1, since the lower order adds two binary signals each corresponding to a 1, the sum thereof being equal to the radix system, i.e., a binary system. Such a full binary adder which is energized by three signals corresponding to 0, 1 and 1 will produce a sum signal corresponding to a 0 and a carry signal corresponding to a 1, which is used by the next higher binary order.

Reference is now made to FIG. 8, which represents in chart form (known as a "Truth Chart") the rules of binary addition of a full binary adder. The columns $C_{-1}$, X and Y represent the three input signals of the carry signal from the lower order, the binary digit of an augend number X and the binary digit of an addend number Y, respectively. The columns S and C, on the other hand, respectively represent the sum output signal and the carry output signal which is used by the next higher binary order.

Let us assume, for example, that in adding numbers X and Y, there is no carry signal from the lower order, i.e., $C_{-1}$ is 0, and that the binary digits of the numbers X and Y are 0 and 1, respectively. This is the example on line 3 of FIG. 8 wherein the input signals are 0, 0 and 1, resulting in a sum output signal corresponding to a 1 and a carry output signal corresponding to a 0. Similarly, all other possible combinations of input signals and the resulting output signals are shown therein.

Referring again to FIGS. 7(*a*) and 7(*b*), the full binary adder 100 shown therein comprises an upper layer 100*a* (FIG. 7(*a*) and a lower layer 100*b* (FIG. 7(*b*)). A plurality of electro-optical elements are arranged on the layer 100*a*, according to the teachings of the invention, in a matrix arrangement of ten columns, indicated 1–10, and thirteen rows, indicated 1–13, the numerals identifying the columns and rows being shown in parentheses. Similarly, electro-optical elements are arranged on the layer 100*b* in a matrix arrangement of ten columns and twelve rows, with each electro-optical element on the layer 100*b* being positioned below a respective electro-optical element on the layer 100*a*. For example, an A element 101*b* in column 1, row 8, of the layer 100*b* is below an E element 101*a* in column 1, row 8, of the layer 100*a*. The elements in each column on the layer 100*a* are connected in parallel to ground through a plurality of conductors 17*a* and to a source of positive potential 19 through a plurality of conductors 16*a*, in a manner similar to the arrangements previously described. The electro-optical elements in each of the rows 1 through 8 of the layer 100*b* are connected in parallel to ground through a plurality of conductors 17*b* and to the source of positive potential 19 through a plurality of conductors 16*b*. The elements in each pair of columns of the layers 100*a* and 102*b*, such as 1 and 2, 3 and 4, etc., are intercoupled to perform as a bistable circuit or flip-flop similar to the circuit 30″ of FIG. 5, so that when E elements in one column of each pair of columns are "ON," the E elements in the other column of the pair are cut off. For example, the columns 1 and 2 in the layer 100*a* are intercoupled by means of electro-optical elements 31, 32, 36 and 37 in columns 1 and 2, rows 9–12 on the layer 100*a* and elements 58″, 57″, 57′ and 58′ in columns 1 and 2, rows 9–12 on the layer 100*b*. These elements are intercoupled in an arrangement similar to the one described in connection with FIG. 5, the elements herein being indicated by the same numerals as those in FIG. 5. In addition to the elements in columns 1 and 2 already described, the novel arrangement of the present invention includes A elements 33 and 39 which are positioned in the layer 100*a* in row 13, columns 1 and 2, respectively. The A elements 33 and 39 function as input elements similar to the A elements 33 and 39 in FIG. 5, so that when an input light signal from an input stage $\mathbf{52}_{C-1}$ illuminates the A element 39, the bistable circuit comprising columns 1 and 2 is switched to a true stable state, i.e., the E elements in column 1, such as the four E elements 101A, are "ON" and are emitting light. However, if the A element 33 is illuminated by an input light signal from an input stage $\mathbf{48}_{C-1}$, the bistable circuit of columns 1–2 is switched to a false stable state so that the E elements, such as the four E elements 102*a* in column 2, are "ON" and emitting light, while the E elements in column 1 are inhibited. The input stages $\mathbf{48}_{C-1}$ and $\mathbf{52}_{C-1}$ are energized to illuminate their respective A elements as a function of the carry binary signal C–1 from the lower binary order corresponding to a 0 and 1, respectively.

Similarly, each pair of columns 3 and 4, 5 and 6, 7 and 8, and 9 and 10 are intercoupled as bistable circuits by means of their respective intercoupled elements 31, 32, 36, 37 in the layer 100*a* and elements 58″, 57″, 57′ and 58′ in the layer 100*b*. The pairs of columns 3 and 4, and 5 and 6 also have A elements 33 and 39 connected therein which may be illuminated by light from input stages $48_X$, $52_X$, $48_Y$, and $52_Y$ so as to set the columns 3 and 4, and 5 and 6 in true or false states, as the case may be. The input stages $48_X$ and $52_X$ are energized to illuminate their respective A elements as a function of the binary digit of the augend number X corresponding to a 0 or a 1, respectively. Similarly, the input stages $48_Y$ and $52_Y$ are energized to illuminate their respective A elements as a function of the binary digit of the addend number Y corresponding to a 0 and a 1, respectively.

The performance of the full binary adder 100 (FIG. 7) will now be explained with a specific example in order to more clearly point out the operation of the circuit. Let us assume that the full binary adder 100 is energized by a carry binary signal which corresponds to a 0, a binary signal from the augend number X corresponding to a 1 and a binary signal from the addend number Y corresponding to a 1. From the above description, it is seen that the input stages $48_{C-1}$, $52_X$ and $52_Y$ will be energized, which in turn will cause the A elements 33, 39 and 39 in columns 1, 4 and 6 to be "ON," inhibiting these columns and resulting in the E elements of columns 2, 3 and 5 being "ON." As seen from FIG. 7, four E elements 102*a* are positioned in column 2 in rows 1–4. In column 3, four E elements 103*a* are positioned in rows 3, 4, 7 and 8, whereas in column 5, four E elements 105*a* are positioned in rows 2, 4, 6 and 8. Since at least one of the E elements 102*a*, 103*a* and 105*a*, which are "ON," is positioned in rows 1, 2, 3, 4, 6, 7 and 8, it is apparent that the A elements which are below them in the layer 100*b* in these seven rows will also be "ON," thereby inhibiting any E element which may be positioned in such rows. For example, an A element 102*b* which is in row 1 will inhibit E elements 108*b* and 110*b*, which are in the same row in columns 8 and 10, respectively. A elements 102*b* and 105*b* will inhibit row 2, thereby cutting off E elements 107*b* and 110*b* in columns 7 and 10 of the same row (2), respectively. A elements 102*b* and 103*b* will inhibit row 3, including E elements 107*b* and 110*b* in columns 7 and 10, respectively. In row 4, A elements 102*b*, 103*b* and 105*b* inhibit the row including E elements 108*b* and 109*b* in columns 8 and 9, respectively. Row 6 is inhibited by A element 105*b*, thereby inhibiting E elements 108*b* and 109*b* in columns 8 and 9, respectively. A element 103*b* inhibits row 7, including E elements 108*b* and 109*b* in columns 8 and 9, respectively; and in row 8, A elements 103*b* and 105*b* inhibit the row including E elements 107*b* and 109*b* in columns 7 and 9, respectively.

From the foregoing it is seen that rows 1–4 and 6–8 are inhibited. Row 5 is the only one which is uninhibited since A elements 101*b*, 104*b* and 106*b* are in columns 1, 4 and 6, respectively, which are cut off since the E elements 101*a*, 104*a* and 106*a* above them in the layer 100*a* are also cut off. Row 5 being uninhibited, E elements 107*b* and 110*b* therein in columns 7 and 10, respectively, are "ON," i.e., emitting light, which in turn illuminates A elements 107*a* and 110*a* in the layer 100*a* above them. As a result of A elements 107*a* and 110*a* being "ON," columns 7 and 10 are inhibited so that column 8, which is intercoupled with column 7, and column 9, which is intercoupled with column 10, are "ON," i.e., any E elements such as E element 38 in row 13 of column 8 and E element 38 in row 13 of column 9 are "ON." The light from the E elements 38 and 34 in columns 8 and 9, respectively, is directed to their respective output stages $47_S$ and $46_C$ which indicate a sum output signal corresponding to a 0 and a carry output signal corresponding to a 1. The output stages $47_S$ and $46_C$ perform in a manner similar to the output stages 47 and 46 of FIG. 5.

From the foregoing it is seen that the full binary adder 100 produces a sum output signal corresponding to a 0 and a carry output signal corresponding to a 1, in response to a 0 carry input signal, a 1 input signal of the augend number, and a 1 input signal from the addend number. That such is the desired result can be seen from the chart in FIG. 7, line 4, where an input 0, 1 and 1 result in a 0 sum and a 1 carry.

To further indicate the satisfactory performance of the full binary adder 100, let us assume that the adder 100 of FIG. 8 is energized by a carry input signal, an input signal from the augend number X, and an input signal from the addend number Y which correspond to a 0, 1 and 0, respectively. From the foregoing, it is clear that the input stages $48_{C-1}$, $52_X$ and $48_Y$ will illuminate their respective A elements 33, 39 and 33 in the layer 100*a* in row 13, columns 1, 4 and 5, respectively. As the A elements are "ON," they inhibit these three columns, resulting in columns 2, 3 and 6 of the E elements therein being "ON." In column 2, the four E elements 102*a* will be "ON," thereby inhibiting, through the A elements 102*b* below them in the layer 100*b*, rows 1 through 4. The four E elements 103*a* in column 3 are in rows 3, 4, 7 and 8, thereby inhibiting rows 7 and 8, in addition to rows 3 and 4 which are already inhibited. In column 6, the E elements 106*a* are in rows 1, 3, 5 and 7, thus inhibiting row 5, in addition to rows 1, 3 and 7 which are already inhibited. Row 6 in the layer 100*b* is the only uninhibited row so that the E elements 108*b* and 109*b* therein in columns 8 and 9 are "ON," which in turn cause their corresponding A elements 108*a* and 109*a* in the layer 100*a* to be "ON," inhibiting columns 8 and 9. With columns 8 and 9 being inhibited, columns 7 and 10 are "ON," so that any E element therein is "ON." As seen in FIG. 7, an E element 34 is positioned in column 7, row 13, and in column 10 and E element 38 is positioned in the same row. The E elements 34 and 38 in columns 7 and 10, respectively, are positioned so as to illuminate output stages $46_S$ and $47_C$, respectively, the output stages indicating a sum output signal corresponding to a 1 and a carry output signal corresponding to a 0. Again, from the chart of FIG. 8, line 2, it can be seen that the adder 100 is operating as a full binary adder by adding input signal 0, 1 and 0 producing a sum signal corresponding to a 1 and a carry signal corresponding to a 0.

Although the bistable circuits in the full binary adder 100 of FIG. 8 are shown as comprising columns which are intercoupled in an arrangement similar to that shown in FIG. 5, it is apparent that each pair of columns may be intercoupled in other arrangements such as those shown in FIGS. 2 or 3, which have already been described. The particular intercoupling of each pair of columns may be varied so long as each pair of columns acts as a bistable circuit. However, the arrangement of the electro-optical elements in the two layers 100*a* and 100*b* in columns 1–10 and rows 1–8 should not be so varied that the full binary adder does not produce two binary output signals in response to three binary input signals as described above.

In the foregoing description the various embodiments of the present invention have been described with reference to input and output stages which produce and are energized by means of optical signals, namely, light. However, it should be apparent to one familiar in the art that other signals, such as electrical signals, may be incorporated in the embodiments disclosed herein. For example, as explained above, the bistable circuit 30 of FIG. 2 is switched to a true state by illuminating the A element 39 which inhibits the E elements 32 and 38. As seen in FIG. 9, which is similar to FIG. 2 except for additional electrical input and output stages, this may also be accomplished by momentarily removing the potential difference across these elements by disconnecting, for example, the ground potential therefrom through a normally closed contact 42 of an input relay 40 which is connected to a source of signals for setting the circuit 30 in a true stable state.

Similarly, the output signals of the circuits of the present invention may be signals other than optical.

For example, a relay 44c (FIG. 9) may be connected across the conductors 16″ and 17″ so that as long as the circuit 30 is in the false state a potential difference sufficient to energize the relay exists between conductors 16″ and 17″, resulting in the closing of normally open contacts $\mathbf{44_O}$ so that an output signal indicating that the circuit 30 is in a false state is produced. Similar circuitry techniques may be applied to the other embodiments of the invention so as to utilize and produce electrical input and output signals. Further, combinations of optical and electrical input and output signals may be produced without departing from the teachings disclosed herein.

Summarizing briefly, according to the teachings of the invention, circuitry arrangements which comprise the basic circuits of computing systems are produced by arranging electro-optical elements in a novel manner so that logical operations including the internal transfer of information is accomplished by means of optical signals. The circuits are adapted to respond and produce optical and/or other signals such as electrical signals. Combinations of bistable circuits such as described in connection with FIGS. 2, 3 and 5 and gating circuits such as described in connection with FIGS. 1 and 4 may be combined and arranged in two arrays on two levels or layers, with the bistable circuits arranged in parallel on substantially one layer and the gates being arranged in another parallel array on a second layer perpendicular to the array on the first layer. The optical signals from bistable circuits to gates and vice versa pass from an electroluminescent element in one layer to a corresponding photoconductive element in the other layer. The geometric perpendicularity between bistable circuits and gates is most desirable for short optical coupling between any two electro-optical devices of dissimilar characteristics. Optical coupling or information transfer at any desired crossover point is easily accomplished by intercoupling an electroluminescent (E) element which is "ON" with a photoconductive A element, causing it to be "ON".

Although only a full binary adder has been described in detail, it is apparent that such description is but one example of the application of teachings disclosed herein in constructing computing systems and that complete computing systems may be constructed by one familiar in the art in accordance therewith. Accordingly, the invention should be considered to include any and all alternative arrangements, modifications, variations and equivalent methods and structures falling within the scope of the annexed claims.

The embodiments of the invention in which an exclusive property or privilege is claimed are defined as follows:

1. An electro-optical system comprising:
a first pair of conductors;
a second pair of conductors;
a source of electrical potential connected to said first and second pairs of conductors for producing a potential difference between the conductors in each of said first and second pairs of conductors;
first and second electroluminescent elements coupled between the conductors of said first and second pairs of conductors, respectively; and
first and second photoconductive elements coupled between the conductors of said first and second pairs of conductors, respectively;
said first and second photoconductive elements being arranged with respect to said second and first electroluminescent elements so that light emitted by either electroluminescent element causes the photoconductive element arranged with respect thereto to substantially reduce the potential difference between the pair of conductors between which it is coupled.

2. An electro-optical system comprising:
a first pair of conductors;
a second pair of conductors;
a source of electrical potential connected to said first and second pairs of conductors for providing a potential difference between the conductors in each of said first and second pairs of conductors;
a first electroluminescent element coupled between said first pair of conductors;
a first photoconductive element coupled between said first pair of conductors;
a second electroluminescent element coupled between said second pair of conductors and so positioned with respect to said first photoconductive element that when said second electroluminescent element is energized said first photoconductive element is also energized;
a second photoconductive element coupled between said second pair of conductors and so positioned with respect to said first electroluminescent element that when said second electroluminescent element is energized said second photoconductive element is also energized; and
input means coupled to said first pair of conductors for deenergizing said first electroluminescent element coupled therebetween so that said second electroluminescent element coupled between said second pair of conductors is energized.

3. The system defined by claim 2 wherein said input means are further coupled to said second pair of conductors for deenergizing said second electroluminescent element coupled therebetween so that said first electroluminescent element coupled between said first pair of conductors is energized.

4. An electro-optical system comprising:
first and second pairs of conductors;
a source of electrical potential connected to said first and second pairs of conductors to produce a potential difference between the conductors of each of said first and second pairs of conductors; and
electro-optical elements coupled between the conductors of said first and second pairs of conductors and including electroluminescent elements and photoconductive elements so positioned with respect to each other that when at least one of said photoconductive elements which is coupled between said first pair of conductors is energized, at least one of said electroluminescent elements which is coupled between said second pair of conductors emits light.

5. An electro-optical system comprising:
first and second layers of electrically substantially nonconductive material;
first and second pairs of electrical conductors positioned on said first and second layers respectively;
a source of potential coupled to said first and second pairs of conductors; and
a plurality of electro-optical elements coupled between the conductors of said first and second pairs of conductors including at least one electroluminescent element and at least one photoconductive element coupled between said first pair of conductors, and at least one electroluminescent element coupled between said second pair of conductors and positioned with respect to said photoconductive element coupled between said first pair of conductors so that light from said electroluminescent element coupled between said second pair of conductors causes said photoconductive element coupled between said first pair of conductors to be illuminated, and at least one photoconductive element coupled between said second pair of conductors and positioned with respect to said electroluminescent element coupled between said first pair of conductors so that light from said electroluminescent element coupled between said first pair of conductors causes said photoconductive element coupled between said second pair of conductors to be illuminated.

6. An electro-optical system comprising:

first and second layers of electrically substantially non-conductive material:

first and second pairs of electrical conductors positioned on said first and second layers, respectively;

a source of potential coupled to said first and second pairs of conductors;

a plurality of electro-optical elements coupled between said first and second pairs of conductors including at least one electroluminescent element and at least one photoconductive element coupled between said first pair of conductors, and at least one electroluminescent element coupled between said second pair of conductors and positioned with respect to said photoconductive element coupled between said first pair of conductors so that light from said electroluminescent element coupled between said second pair of conductors causes said photoconductive element coupled between said first pair of conductors to be illuminated, and at least one photoconductive element coupled between said second pair of conductors and positioned with respect to said electroluminescent element coupled between said first pair of conductors so that light from said electroluminescent element coupled between said first pair of conductors causes said photoconductive element coupled between said second pair of conductors to be illuminated; and means coupled to said first pair of conductors for inhibiting light from said electroluminescent element coupled therebetween so that said electroluminescent element coupled between said second pair of conductors emits light.

7. An electro-optical bistable circuit comprising:

first and second layers of material;

first and second pairs of conductors positioned on said first and second layers, respectively, and adapted to have a potential difference impressed across each pair of conductors;

first and second electroluminescent elements coupled between the conductors of said first and second pairs of conductors, respectively;

first and second photoconductive elements coupled between the conductors of said first and second pairs of conductors, respectively, and positioned with respect to said second and first electroluminescent elements so that light from said first electroluminescent element is adapted to illuminate said second photoconductive element, and light from said second electroluminescent element is adapted to illuminate said first photoconductive element; and means coupled to at least one conductor of said first pair of conductors and responsive to an input signal for inhibiting light from said first electroluminescent element so that light is emitted by said second electroluminescent element coupled to said second pair of conductors.

8. The bistable circuit defined by claim 7, wherein said means further include means coupled to at least one conductor of said second pair of conductors and responsive to another input signal for inhibiting light from said second electroluminescent element so that light is emitted by said first electroluminescent element coupled to said first pair of conductors.

9. An electro-optical bistable circuit comprising:

first and second layers of material;

first and second pairs of conductors positioned on said first and second layers and adapted to have a potential difference impressed across each pair of conductors:

first and second electroluminescent elements and first and second photoconductive elements coupled between said first pair of conductors; and third and fourth electroluminescent elements and third and fourth photoconductive elements coupled between said second pair of conductors, said third electroluminescent element and said fourth photoconductive element being so positioned with respect to said first photoconductive element and said second electroluminescent element, respectively, that light from said second and third electroluminescent elements illuminate said fourth and first photoconductive elements, respectively, said second photoconductive element being adapted to respond to a first input signal to inhibit light from said first and second electroluminescent elements and cause said third and fourth electroluminescent elements to emit light, said third photoconductive element being adapted to respond to a second input signal to inhibit light from said third and fourth electroluminescent elements and cause said first and second electroluminescent elements to emit light, and said first and fourth electroluminescent elements being adapted to produce first and second output signals, which indicate that said third and fourth electroluminescent elements and said first and second electroluminescent elements are respectively inhibited.

10. An electro-optical bistable circuit comprising:

first and second layers of material;

a first pair of conductors positioned on said first layer and adapted to have a potential difference applied thereacross;

first and second electroluminescent elements and first and second photoconductive elements coupled between said first pair of conductors;

a third electroluminescent element and third photoconductive element positioned on said first layer;

a fourth electroluminescent element and a fourth photoconductive element positioned on said second layer with respect to said first photoconductive element and said first electroluminescent element so that light emitted by said first and fourth electroluminescent elements illuminates said fourth and first photoconductive elements, respectively; and a second pair of conductors coupled across said third and fourth electroluminescent elements and said third and fourth photoconductive elements, said second pair of conductors being adapted to have a potential difference applied thereacross, said second photoconductive element being adapted to respond to a first input signal to inhibit light from said first and second electroluminescent elements and cause said third and fourth electroluminescent elements to emit light, said third photoconductive element being adapted to respond to a second input signal to inhibit light from said third and fourth electroluminescent elements and cause said first and second electroluminescent elements to emit light, and said first and fourth electroluminescent elements being adapted to produce first and second output signals which indicate that said third and fourth electroluminescent elements and said first and second electroluminescent elements are respectively inhibited.

11. An electro-optical bistable circuit comprising:

first and second layers of material;

first and second pairs of conductors positioned substantially parallel to one another on said first layer, said first and second pairs of conductors being adapted have a potential difference impressed across the conductors of each pair;

first and second electroluminescent elements coupled between the conductors of said first and second pairs of conductors, respectively;

first and second photoconductive elements coupled between the conductors of said first and second pair of conductors, respectively;

first means positioned on said second layer with respect to said first electroluminescent element and said second photoconductive element for energizing said second photoconductive element whenever said first electroluminescent element emits light; and second means positioned on said second layer with respect to said second electroluminescent element and said first photoconductive element for energizing said first photoconductive element whenever said second electroluminescent element emits light.

12. The bistable circuit defined by claim 11 further including:

first input means coupled to at least one conductor of said first pair of conductors for inhibiting light emission by said first electroluminescent element so that said second photoconductive element is cut off; and second input means coupled to at least one conductor of said second pair of conductors for inhibiting light emission by said second electroluminescent element so that said first photoconductive element is cut off.

13. An electro-optical bistable circuit comprising:

first and second layers of material;

first and second pairs of conductors positioned on said first layer substantially parallel to one another, said first and second pair of conductors being adapted to have a potential difference applied across the conductors of each pair;

first and second electroluminescent elements coupled between the conductors of said first and second pairs of conductors, respectively;

first and second photoconductive elements coupled between the conductors of said first and second pairs of conductors;

third and fourth pairs of conductors, positioned on said second layer of material and adapted to have a potential difference applied across the conductors of each pair;

a third electroluminescent element and a third photoconductive element connected in series between said third pair of conductors and so positioned with respect to said first photoconductive element and said second electroluminescent element that light from said second electroluminescent element energizes said third photoconductive element, thereby energizing said third electroluminescent element to produce light which in turn energizes said first photoconductive element; and a fourth electroluminescent element and a fourth photoconductive element connected in series between said fourth pair of conductors and so positioned with respect to said second photoconductive element and said first electroluminescent element that light from said first electroluminescent element energizes said fourth photoconductive element, thereby energizing said fourth electroluminescent element to produce light which in turn energizes said second photoconductive element.

14. The bistable circuit defined by claim 13 further including:

first input means coupled to at least one conductor of said first pair of conductors for inhibiting the light from said first electroluminescent element so that light is emitted from said second electroluminescent element; and second input means coupled to at least one conductor of said second pair of conductors for inhibiting the light from said second electroluminescent element so that light is emitted from said first electroluminescent element.

15. The bistable circuit defined by claim 13 further including:

a fifth photoconductive element coupled between said first pair of conductors and responsive to a first optical input signal for inhibiting the light from said first electroluminescent element so that light is emitted from said second electroluminescent element; and a sixth photoconductive element coupled between said second pair of conductors and responsive to a second optical input signal for inhibiting the light from said second electroluminescent element so that light is emitted from said first electroluminescent element.

16. The bistable circuit defined by claim 15 further including:

a fifth electroluminescent element coupled between said first pair of conductors for producing a first optical output signal whenever said first electroluminescent element emits light; and a sixth electroluminescent element coupled between said second pair of conductors for producing a second optical output signal whenever said second electroluminescent element emits light.

17. An electro-optical full binary adder comprising:

sum and carry output elements;

first, second and third input elements adapted to receive respectively first binary input signals corresponding to a carry signal of a previous digit order, second binary input signals representative of an augend and third binary input signals respresentative of an addend;

first, second and third electro-optical bistable circuits responsive to said first, second and third binary input signals, respectively, for setting each of said electro-optical bistable circuits in either a first or second stable state depending whether said binary input signal represents a binary "1" or binary "0";

twenty-four electroluminescent output elements, eight of said twenty-four electroluminescent output elements being coupled to each of said first, second and third electro-optical bistable circuits and arranged in predetermined matrices, four of said eight electroluminescent elements coupled to each of said bistable circuits producing optical signal indicating that said circuit is in said first stable stable, and the other four of said eight electroluminescent elements coupled to each of said bistable circuits producing optical signals indicating that said circuit is in said second stable state;

forty electro-optical elements including sixteen electroluminescent elements and twenty-four photoconductive elements arranged in eight rows, each row comprising two of said sixteen electroluminescent elements and six of said twenty-four photoconductive elements, said twenty-four photoconductive elements being positioned with respect to said twenty-four electroluminescent output elements so that optical signals from some but not all of said twenty-four electroluminescent output elements energize some but not all of said twenty-four photoconductive elements in seven of said eight rows, thereby inhibiting light from being emitted from all but two of said sixteen electroluminescent elements; and sum and carry bistable circuits, including input means responsive to the light from the two electroluminescent elements out of the sixteen electroluminescent elements which are not inhibited for setting said sum and carry bistable circuits in either of two stable states and producing sum and carry output signals in said sum and carry output elements which represents whether said sum and carry output signals each represent a "0" or a "1."

18. An electro-optical binary computing system comprising:

N electroluminescent bistable circuits each responsive to a binary input signal and adapted to be set in a true or a false stable state depending whether said binary input signal represents a binary "1" or binary "0";

a first plurality of optical means arranged in a predetermined matrix and coupled to said N electro-optical bistable circuits for producing a plurality of optical signals indicative of which circuits of said N electro-optical bistable states are in said true stable state and which circuits of said N electro-optical bistable states are in said false stable states; and a second plurality of optical means arranged in a matrix similar to said predetermined matrix, each of the optical means in said second plurality of optical means being responsive to the optical signal produced by each one of the optical means in said first plurality of optical means for producing a plurality of signals which is related to the computation performed on the N binary signals, each of which may represent a binary "1" and a binary "0."

19. In an electro-optical binary computing system wherein binary input signals are operated upon in predetermined arithmetic operations to produce output signals, the arrangement comprising:

a plurality of electroluminescent elements coupled to a plurality of bistable circuits in a predetermined matrix which is a function of said predetermined arithmetic operations for producing a combination of output signals as a function of said binary input signals; and means including a plurality of photoconductive elements each of which is positioned with respect to one of said electroluminescent elements to receive an optical signal therefrom for producing binary output signals, which represent said binary input signals as operated upon in said predetermined arithmetical operation.

References Cited by the Examiner

UNITED STATES PATENTS

| | | | |
|---|---|---|---|
| 2,885,564 | 5/1960 | Marshall | 307—88.5 |
| 2,947,874 | 8/1960 | Tomlinson | 307—88.5 |
| 2,949,538 | 8/1960 | Tomlinson | 307—88.5 |
| 2,952,792 | 9/1960 | Yhap | 307—88.5 |
| 3,040,178 | 6/1962 | Lyman | 250—213 |
| 3,110,813 | 11/1963 | Sack | 235—194 |

OTHER REFERENCES

February 1960—Low "Photologic 'Exclusive Or' Block," IBM Technical Disclosure Bulletin, vol. 2, No. 5.

MALCOLM A. MORRISON, *Primary Examiner.*

I. FAIBISCH, *Assistant Examiner.*

UNITED STATES PATENT OFFICE
CERTIFICATE OF CORRECTION

Patent No. 3,270,187 August 30, 1966

Sergei M. Fomenko

It is certified that error appears in the above identified patent and that said Letters Patent are hereby corrected as shown below:

Column 2, line 65, "resistsance" should read -- resistance --. Column 10, line 41, before "producing" insert -- and --. Column 11, lines 68 and 69, "elecluminescent" should read -- electroluminescent --. Column 12, line 19, "second" should read -- first --. Column 16, line 39, "stable", second occurrence, should read -- state --.

Signed and sealed this 12th day of August 1969.

(SEAL)
Attest:

Edward M. Fletcher, Jr. WILLIAM E. SCHUYLER, JR.
Attesting Officer Commissioner of Patents